3,104,518
SHOCK-DAMPING BEARING FOR
CLOCKWORK GEARS
Jean-François Christen, Geneva, Switzerland, assignor to
Novochoc S.A., La Chaux-de-Fonds, Switzerland
Filed Nov. 8, 1960, Ser. No. 68,069
1 Claim. (Cl. 58—140)

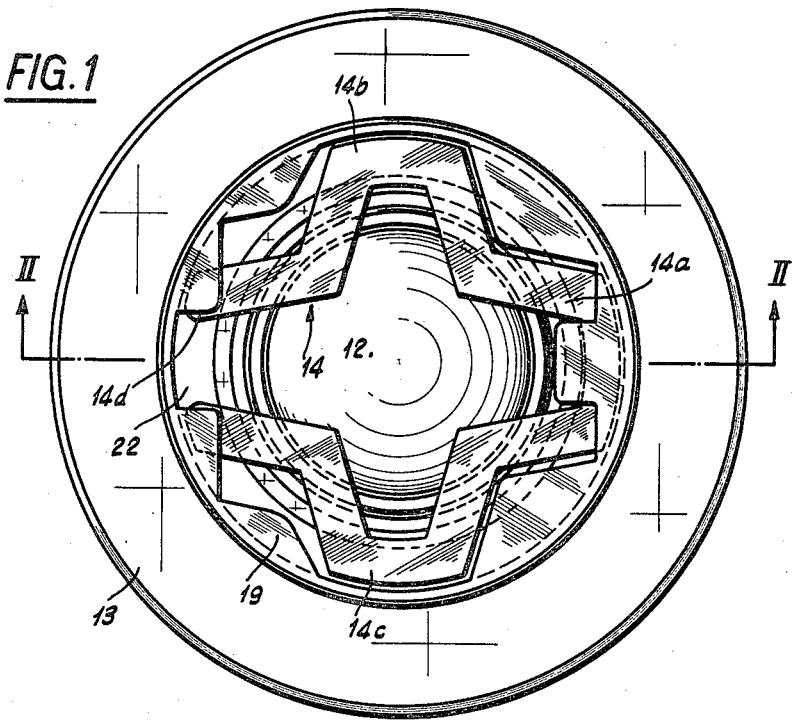
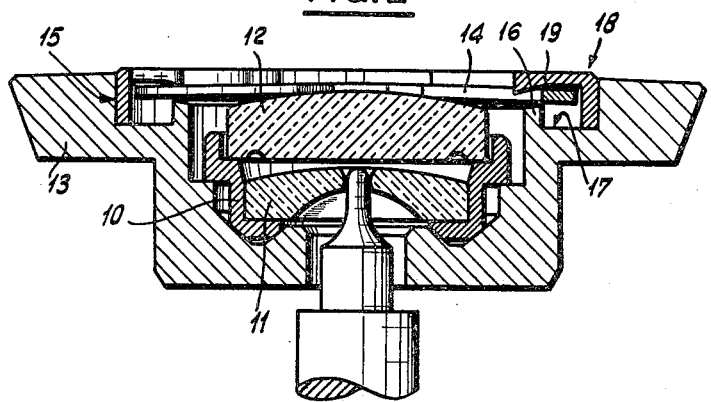

My invention has for its object, a shock-damping bearing for a clockwork gear, of the type including an end-stone and a through-stone fitted in a bezel, a bearing body inside which the bezel is housed and a return spring urging said bezel into position. According to my invention, the bezel is centered inside the bearing body by frusto-conical surfaces formed underneath the through-stone.

The accompanying drawings illustrate by way of example a preferred embodiment of said invention. In said drawings:

FIG. 1 is a plan view, the spring being in its inoperative position, while

FIG. 2 is a sectional view through line II—II of FIG. 1.

The bearing illustrated includes a bearing through-stone 11 and an end-stone 12 both fitted in a bezel 10 while the latter is housed inside a body of revolution 13 forming the actual body of the bearing and a spring 14 urges the bezel into its operative position in said body and holds it in said position. Said spring is constituted by a stamped metal member in the shape of a star with four truncated arms 14a, 14b, 14c, 14d, which latter arm 14d is cut open.

The bezel 10 bears against the body 13 through the agency of two inwardly and outwardly facing frusto-conical surfaces mating two corresponding frusto-conical surfaces formed on the body 13. Said surfaces which ensure the centering of the bezel are formed underneath the through-stone 11. Said arrangement cuts out any risk of deformation of the frusto-conical surfaces of the bezel during the position of the through-stone. In fact, even if such a positioning were to produce a deformation of the bezel, this deformation would appear only in the area of the bezel extending outside the plane containing the lower surface of the through-stone. Furthermore, this arrangement allows a more compact structure to be obtained.

The upper section of the bearing body 13 is provided with an annular groove 17 bounded inwardly by an upstanding cylindrical flange 16 surrounding the end-stone. Inside the cylindrical bore 15 formed in the body 13 and defining said groove outwardly, is fitted frictionally a ring 18 provided with an annular inturned flange 19. Said flange 19 is shaped so as to form with the cylindrical flange 16, a recess along a fraction of the periphery of the bearing, which recess houses the end of the arm 14a of the spring 14 round which end said spring 14 may rock when it is desired to remove the bezel 10 out of the bearing body 13. At a point which is diametrically opposed to said recess, the flange 19 is provided with a gap 22, which allows inserting through elastic deformation, the ends of the two convergent sections of the open arm 14d.

What I claim is:

In a shock-damping balance staff bearing, the combination of an end-stone, a through-stone, a bezel carrying said end-stone, and through-stone coaxially and provided at its lower end with two frusto-conical coaxial bearing surfaces, the lower geometrical extensions of which meet along a circular line, a support provided with two upwardly facing frusto-conical bearing surfaces matching the corresponding frusto-conical bearing surfaces of the bezel to carry the latter, an upstanding annular member rigid with the support and including a section surrounding coaxially at a distance the end-stone and provided with an upwardly open annular groove extending in a horizontal plane passing through the end-stone, a ring fitted in said groove with an annular spacing between its inner surface and the inner surface of the groove, a first inner flange portion rigid with the inner edge of said ring, extending over a short portion of said spacing in the groove, two further inner flange portions rigid with the inner edge of said ring to either side of a point diametrically opposed to said first flange portion to leave a short gap between said further flange portions, a projection inwardly rigid with said first flange portion, a unitary spring constituted by two symmetrical substantially V-shaped sections, each of which includes a central part extending over the groove, two arms arranged symmetrically of said central part and extending between the outer ends of said central part and an apex resting on the upper surface of the end-stone, and lateral extensions at the outer ends of said arms directed symmetrically towards the groove to engage the underside of the first flange portion and of the corresponding further flange portion respectively, and an intermediate section lying over the groove underneath the first flange portion and rigidly interconnecting the lateral extensions of the corresponding arms of the two V-shaped sections, said spring being adapted to pivot upwardly round its intermediate section upon closing together the arms of the two V-shaped sections remote from said intermediate section into registry with the gap between the further flange portions.

References Cited in the file of this patent
UNITED STATES PATENTS

| 2,219,068 | Colomb | Oct. 22, 1940 |
| 2,233,743 | Marti | Mar. 4, 1941 |

FOREIGN PATENTS

| 283,486 | Switzerland | Oct. 1, 1952 |
| 289,111 | Switzerland | Jan. 16, 1953 |
| 346,172 | Switzerland | June 15, 1960 |
| 1,130,140 | France | July 23, 1955 |